US007447173B2

(12) United States Patent
Harris

(10) Patent No.: US 7,447,173 B2
(45) Date of Patent: Nov. 4, 2008

(54) METHODS FOR TRANSMITTING DATA PACKETS AND SUPPORTING APPARATUS

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 507 days.

(21) Appl. No.: 11/205,517

(22) Filed: Aug. 17, 2005

(65) Prior Publication Data

US 2007/0041341 A1 Feb. 22, 2007

(51) Int. Cl.
*H04Q 7/24* (2006.01)

(52) U.S. Cl. ...................................... 370/328; 370/352

(58) Field of Classification Search ....................... None
See application file for complete search history.

(56) References Cited

U.S. PATENT DOCUMENTS

2007/0047515 A1* 3/2007 Jonsson et al. ............. 370/352

* cited by examiner

*Primary Examiner*—Erika A Gary

(57) ABSTRACT

In embodiments described herein, responsive to a request to communicate with a target mobile station, recording of streaming content is initiated (506) and recorded (510) to provide recorded streaming content. An initial data packet with the recorded streaming content is generated (518) after a maximum duration of streaming content has been recorded, wherein the maximum duration of streaming content is of substantially a longest duration possible for the recorded streaming content such that the initial data packet is available on a target communication link at substantially a same time that the target mobile station completes establishing a dedicated communication channel appropriate for streaming content. This initial data packet is then accordingly sent (520) to the target mobile station.

19 Claims, 5 Drawing Sheets

METHODS FOR TRANSMITTING DATA PACKETS AND SUPPORTING APPARATUS

TECHNICAL FIELD

This invention relates generally to a transmission technique for transmitting data packets between an originator mobile station and a target mobile station.

BACKGROUND

A significant factor in push to talk audio delay in a wireless communication system is the channel establishment delay between the time when an audible "talk permit tone" beep is played and the target channel being established. In many systems, the transmission time for the amount of audio required to meet the target play out buffer depth is approximately 650 milliseconds of audio, which is composed in approximately four or more packets. The target play out buffer depth corresponds to the amount of extra streaming content needed in order to provide content in the cases where there is variable latency between the mobile stations. Since a same packet length is currently used for all audio packets, these four or more packets of the first 650 milliseconds are typically queued in the infrastructure while waiting for the target channel to complete establishment. The channel establishment delay, in many systems, is at least 1000 milliseconds. Because any time delay in the system can cause resources to be wasted and/or user dissatisfaction, it is desirable to reduce the delay and/or provide more efficient transmission of these data packets between the originator mobile station and the target mobile station.

BRIEF DESCRIPTION OF THE DRAWINGS

The above needs are at least partially met through provision of the data packet transmission technique described in the following detailed description, particularly when studied in conjunction with the drawings, wherein.

Figure 1:
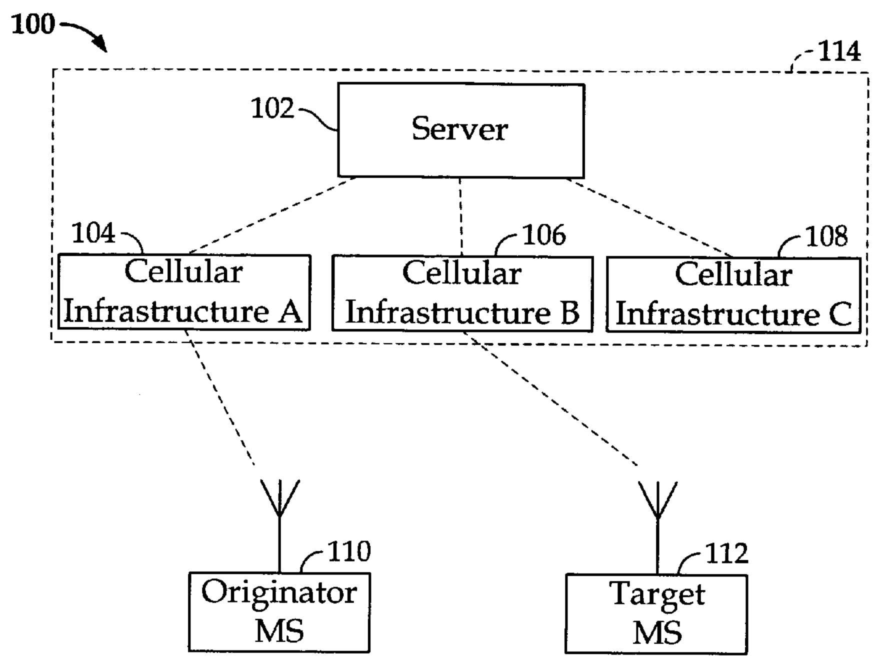
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, responsive to a request to communicate with a target mobile station, recording of streaming content is initiated and recorded to provide recorded streaming content. An initial data packet with the recorded streaming content is generated after a maximum duration of streaming content has been recorded, wherein the maximum duration of streaming content is of substantially a longest duration possible for the recorded streaming content such that the initial data packet is available on a target communication link at substantially a same time that the target mobile station completes establishing a dedicated communication channel appropriate for streaming content. This initial data packet is then accordingly sent to the target mobile station. In one embodiment, the target mobile station completing the establishment of the dedicated communication channel appropriate for streaming content refers a time when both a target radio access network and the target mobile station have knowledge that the dedicated communication channel is established and/or a time when a server has knowledge that the dedicated communication channel is established.

According to one embodiment, the maximum duration of streaming content is less than a play-out buffer depth target of the target mobile station and/or a maximum data packet size allowed by transport protocols. For an embodiment, the maximum duration of streaming content is estimated for the initial data packet. Specifically, in an embodiment, the maximum duration of streaming content is based on any one or more selected from a group comprising a number of milliseconds per vocoded frame, a duration of time until an originator mobile station completes being placed on a traffic channel, a fixed delay after a last vocoded frame is recorded by the originator mobile station before the data packet is ready on transmission on a reverse link, transmission bit rate across a speaker reverse link, a fixed network delay incurred delivering a packet from a cellular infrastructure of the originator mobile station up to a server and then down to a cellular infrastructure of a target mobile station, and bits per packet containing predefined vocoded frames.

In an embodiment, prior to initiating the recording of streaming content, a talk-permit-tone is provided to a user. According to another embodiment, prior to the initial data packet being generated, the recorded streaming content is encoded with a lower quality than a subsequent data packet. For another embodiment, a determination is made as to whether the maximum duration of streaming content has been recorded, and if not, the process waits for more streaming content to be recorded until the maximum duration of streaming content has been recorded. According to an embodiment, another determination is made as to whether the dedicated communication channel has been terminated, and if so, communication with the dedicated communication channel ends.

In one embodiment, additional streaming content is recorded for communication with the target mobile station to provide additional recorded streaming content, which is used to generate a next data packet after a predefined duration of streaming content has been recorded. The next data packet is then sent to the target mobile station. For this embodiment, the predetermined duration of streaming content is preferably of a shorter duration than the maximum duration of streaming content of the initial data packet. Prior to generating the next data packet, the additional recorded streaming content is encoded with a higher quality than the initial data packet. According to one embodiment, it is determined whether the predetermined duration of streaming content has been recorded, and if not, the process waits for more streaming content to be recorded until the predetermined duration of streaming content has been recorded.

In various embodiments, an initial data packet having a non-compressed header without streaming content is generated when an originator mobile station and a target mobile station are connected on a dedicated communication channel, and the initial data packet is accordingly sent to the target mobile station, followed by or while a predefined duration of streaming content being recorded to provide a recorded predefined duration of streaming content. A next data packet having a compressed header with the recorded predefined duration of streaming content is generated and sent to the target mobile station.

According to one embodiment, prior to the initial data packet being generated, a talk-permit-tone is provided to a user. In another embodiment, prior to the next packet being generated, a determination is made as to whether the predefined duration of streaming content has been recorded, and if not, the process waits for more streaming content to be recorded until the predefined duration of streaming content has been recorded. According to an embodiment, another determination is made as to whether the dedicated communication channel has been terminated, and if so, communication with the dedicated communication channel ends.

According to various embodiments, an apparatus is provided that includes a streaming content circuit that initiates recording of streaming content responsive to a request to communicate with a target mobile station and records the streaming content to provide recorded streaming content, a packet generator circuit coupled to the streaming content circuit that generates an initial data packet with the recorded streaming content after a maximum duration of streaming content has been recorded in such a way that the maximum duration of streaming content is of substantially a longest duration possible for the recorded streaming content such that the initial data packet is available on a communication link at substantially a same time that the target mobile station establishes a dedicated communication channel, and a transceiver circuit coupled to the packet generator circuit that sends the initial data packet to the target mobile station. In one embodiment, the streaming content circuit records additional streaming content for communication with the target mobile station to provide additional recorded streaming content, the packet generator circuit generates a next data packet with the additional recorded streaming content after a predetermined duration of streaming content has been recorded, wherein the predetermined duration of streaming content is of a shorter duration than the maximum duration of streaming content of the initial data packet, and the transceiver circuit sends the next packet to the target mobile station.

Through the various embodiments, an improved data packet transmission technique has been provided that, among other things, reduces the audio delay of the transmission by approximately as much as 150 milliseconds in one embodiment. In another embodiment, the audio delay is reduced by approximately as much as 40 milliseconds. Furthermore, the various teachings effectively reduce the number of packets of the initial audio transmission by as much as 12%, which, in turn, reduces network load. In other words, the various teachings described reduce the current audio delay, while, at the same time, provide a more efficient use of data packet transmission. Moreover, since the various embodiments can be implemented easily at the client level, the feature implementation costs are minimal.

Referring now to the drawings, and in particular to FIG. 1, for purposes of providing an illustrative but non-exhaustive example to facilitate this description, a specific operational paradigm using a wireless communication system is shown and indicated generally at 100. Those skilled in the art, however, will recognize and appreciate that the specifics of this illustrative example are not specific to the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), and General Packet Radio Service ("GPRS") systems. In fact, any communication network that transmits data packets is contemplated, and these various embodiments are within the scope of the invention.

Referring now to the exemplary communication network shown in FIG. 1, a server 102 is operably coupled to multiple cellular infrastructures 104, 106, 108. The radio access network 104, 106, 108, in turn, provide service to multiple mobile stations ("MSs") 110, 112 (two shown) via associated transceivers (not shown), such as Base Transceiver Stations (BTSs) or Node Bs. Since current cell phones have many similar functions to that of computer devices, a mobile station will be herein used to refer to any device that can transmit data packets, which includes, but is not limited to, cell phones, personal digital assistants, and/or computers. In this example, MS 110 is an originator MS that is trying to communicate with MS 112, which would be referred to as the target MS. In other words, the originator MS 110 will initiate a call setup with the target MS 112, which will result in data packets being sent between the two MSs. Please note, however, that the originator and target mobile stations include speaker and listener mobile stations, meaning that the speaker mobile station may not necessarily be an originator of the transmission and the listener mobile station may not be a target of the transmission. Rather, both mobile stations are exchanging data at various times, and as such, each mobile station can be an originator, target, speaker, and listener at different times. But for simplicity, these mobile stations will be referred to as an originator mobile station and a target mobile station.

Specifically in FIG. 1, the originator MS 110 transmits data packets to the cellular infrastructure 104, and the target MS 112, in turn, responds to the cellular infrastructure 106. The data packets obtained by the cellular infrastructure 104 are controlled by the server 102 that responds and routes the various data packets through the cellular infrastructure 106 that is serving the target MS 112. The server 102 along with the cellular infrastructures 104, 106, 108 will herein be referred to as a network controller 114 to emphasize that the various teachings described can transmit data packets to either the server or the serving cellular infrastructure included in a cellular infrastructure. Please note that not all of the components of various cellular infrastructures have been shown. One skilled in the art, however, can readily appreciate that a cellular infrastructure includes, among other things, radio access networks, base stations, base station controllers, packet data serving nodes. The communication system 100 shown is a typical exemplary structure of data packet transmissions between an originator MS and a target MS.

Figure 2:
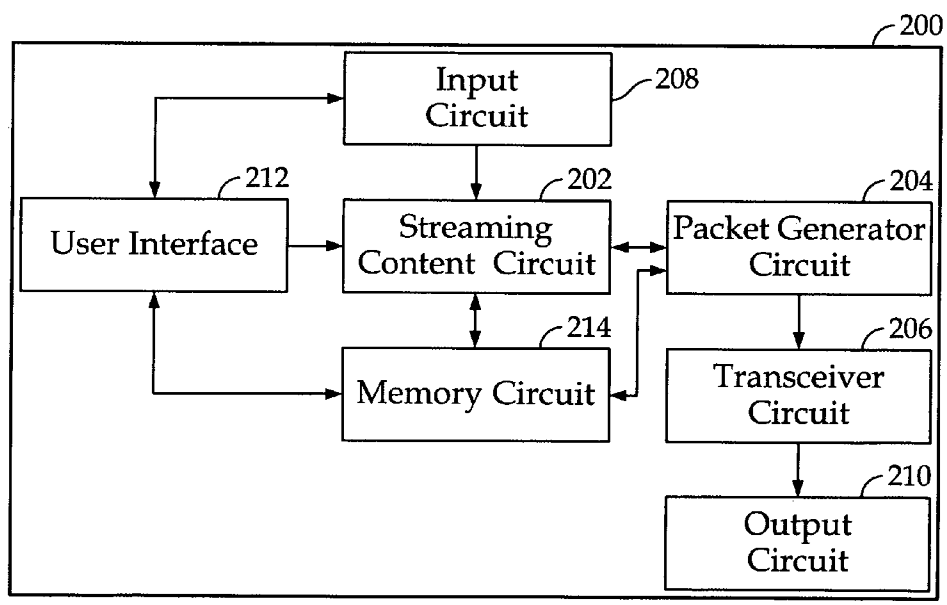
FIG. 2 comprises a block diagram of a mobile station suitable for various embodiments of the invention.

Referring to FIG. 2, a MS 200 suitable for various embodiments is shown. For simplicity and clarity, it should be noted that FIG. 2 does not include all the hardware components needed in a typical MS, which are commonly included and known in the art. Moreover, as a skilled artisan readily appreciates, other hardware configurations and circuitry topology layouts, although not shown, can be used to implement the various teachings described. As such, the MS 200 shown in FIG. 2 is provided as a practical example to implement the teachings of the various embodiments. Moreover, "circuit" refers to one or more component devices such as, but not limited to, processors, memory devices, application specific integrated circuits (ASICs), and/or firmware, which are created to implement or adapted to implement (perhaps through the use of software) certain functionality, all within the scope of the various teachings described.

In this exemplary MS shown, a streaming content circuit 202 is included to initiate recording of streaming content responsive to a request to communicate with a target mobile station, and the streaming content is recorded to provide recorded streaming content to a packet generator circuit 204. The packet generator circuit, which is coupled to the streaming content circuit 202, in turn, generates an initial data packet with the recorded streaming content after a maximum duration of streaming content has been recorded in such a way that the maximum duration of streaming content is of substantially a longest duration possible for the recorded streaming content such that the initial data packet is available on a communication link at substantially a same time that the target mobile station establishes a dedicated communication channel. A transceiver circuit 206 that is coupled to the packet generator circuit 204 accordingly sends the initial data packet to the target mobile station.

After the initial data packet is sent, the streaming content circuit records additional streaming content for communication with the target mobile station to provide additional recorded streaming content, and the packet generator circuit generates a next data packet with the additional recorded streaming content after a predetermined duration of streaming content has been recorded, followed by the transceiver circuit sending the next packet to the target mobile station. According to an embodiment, this predetermined duration of streaming content is preferably of a shorter duration than the maximum duration of streaming content of the initial data packet.

Since multiple embodiments of the maximum duration of streaming content are possible for the initial data packet, the appropriate predetermined duration depends upon the value of the maximum duration of streaming content for the initial data packet. An appropriate maximum duration, in turn, depends upon the communication system. In particular, the maximum duration can be based on numerous factors, such as, but not limited to, a group of a number of milliseconds per vocoded frame, a duration of time until an originator mobile station completes being placed on a traffic channel, a fixed delay after a last vocoded frame is recorded by the originator mobile station before the data packet is ready on transmission on a reverse link, transmission bit rate across a speaker reverse link, a fixed network delay incurred delivering a packet from a cellular infrastructure of the originator mobile station up to a server and then down to a cellular infrastructure of a target mobile station, and bits per packet containing predefined vocoded frames. In one embodiment, the maximum duration of streaming content is preferably intentionally less than a play-out buffer depth target of the target mobile station and a maximum data packet size allowed by transport protocols.

As typically provided in a mobile station, an input circuit 208, such as a recorder, is included to provide, for example, audio data, to the streaming content circuit 202. An output circuit 210, such as an antenna, is included to provide data transmission to the infrastructure, such as the target mobile station or the network controller 114. A user interface 212 is also included to obtain user inputs, and a memory circuit 214 is used to provide memory to either temporarily or permanently store information.

Figure 3:
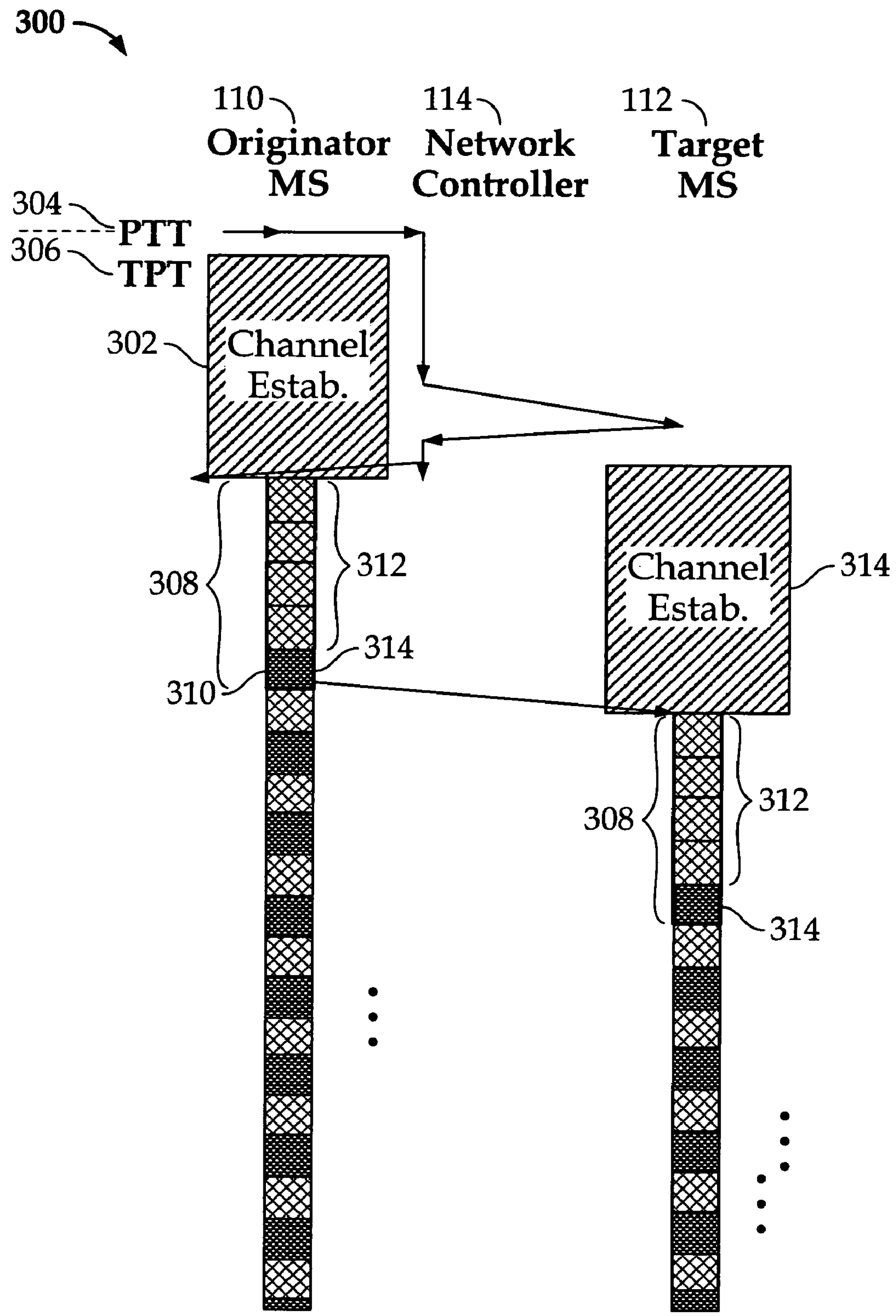
FIG. 3 comprises a block diagram of an initial transmission according to various embodiments of the invention.

Turning now to FIG. 3, a block diagram of an initial transmission according to various embodiments of the invention is shown and indicated generally at 300. In this block diagram 300, the originator mobile station 110 initiates a channel establishment 302 after a push-to-talk ("PTT) 304 is invoked and a talk-permit-tone ("TPT") 306 is received. In these various teachings, instead of sending four separate data packets with four separate headers, the originator mobile station 110 is adapted to generate an initial packet 308 along with its header 310 after the maximum duration of streaming content 312 has been recorded, specifically this is done after the channel is fully established at the originator mobile station. At the same time while the originator mobile station 110 is establishing its channel, the target mobile station 112 also begins its channel establishment 314 process.

In the preferred embodiment, the maximum duration of streaming content is of substantially a longest duration possible for the recorded streaming content such that the initial data packet is available on a target communication link at substantially a same time that the target mobile station completes establishing a dedicated communication channel appropriate for streaming content. As noted, however, because the proper maximum duration of streaming content depends upon numerous factors, multiple maximum durations of streaming content are contemplated. As such, these various embodiments are within the scope of the various embodiments described. The initial packet 308 along with its header 310 is accordingly sent via the network controller 114 to the target mobile station 112, and as a result, the streaming content 308 from the originator mobile station 110 is received almost at the same time that the target mobile station completes establishing its dedicated communication channel. Depending upon specific implementation, the time when the target mobile station completes establishing the dedicated communication channel may refer to different time periods, such a time when both a target radio access network and the target mobile station have knowledge that the dedicated communication channel is established and/or a time when a server has knowledge that the dedicated communication channel is establish. From the various teachings, since four separate data packets along with four headers for each packet are replaced with a single packet with a single header, the audio delay is reduced by as much as 350 milliseconds in an example system.

Figure 4:
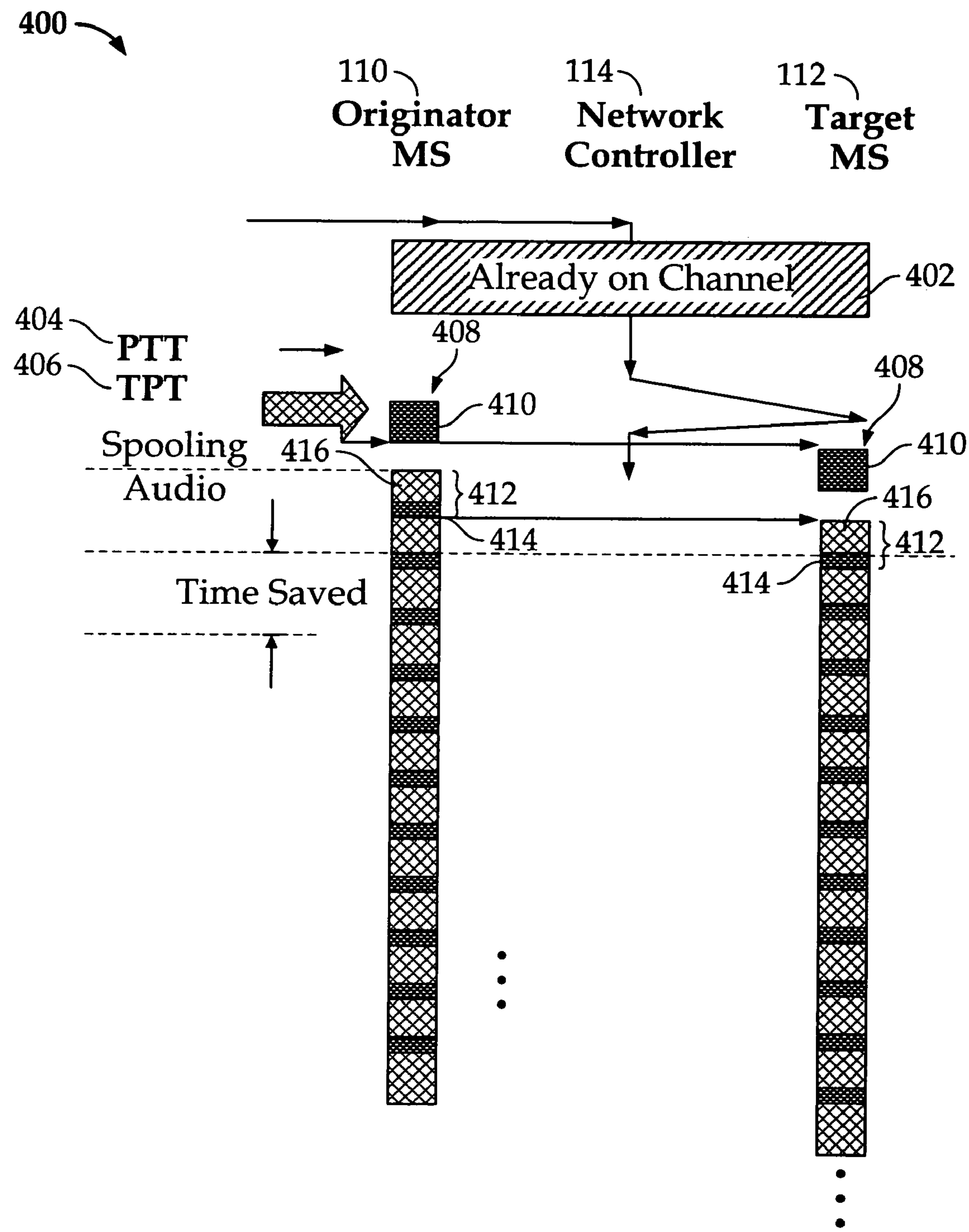
FIG. 4 comprises a block diagram of a transmission after a dedicated communication channel has been established according to various embodiments of the invention.

Referring now to FIG. 4, a block diagram of a transmission after a dedicated communication channel has been established according to various embodiments of the invention is shown and indicated generally at 400. In this diagram 400, as shown, the originator mobile station 110 and the target mobile station 112 are already on the dedicated communication channel 402, assuming that the originator mobile station 110 has previously invoked a push-to-talk 404 and received a talk-permit-tone 406. In this case shown, an initial data packet 408 having a non-compressed header 410 without streaming content is generated and sent when both mobile stations are connected on the dedicated communication channel. A predefined duration of streaming content is then recorded to generate a next data packet 412 having a compressed header 414 with a recorded predefined duration of streaming content 416.

By sending a compressed and noncompressed header to both the next data packet and the initial data packet, as much as approximately 40 milliseconds are minimized in the audio delay as compared to current systems. Similar to the maximum duration of streaming content, the predefined duration depends greatly upon the configuration of the communication system, and as such, multiple predefined durations are contemplated and are within the scope of the various embodiments described. Moreover, although push-to-talk has been shown as an example of the audio delay, as one skilled in the art would readily appreciate, other communication systems are contemplated. Thus, the various embodiments are not limited to a push-to-talk communication system, as shown in FIGS. 3 and 4. In fact, the various embodiments provided can be implemented in any communication system where data packets are being exchanged between two clients via a network.

Figure 5:
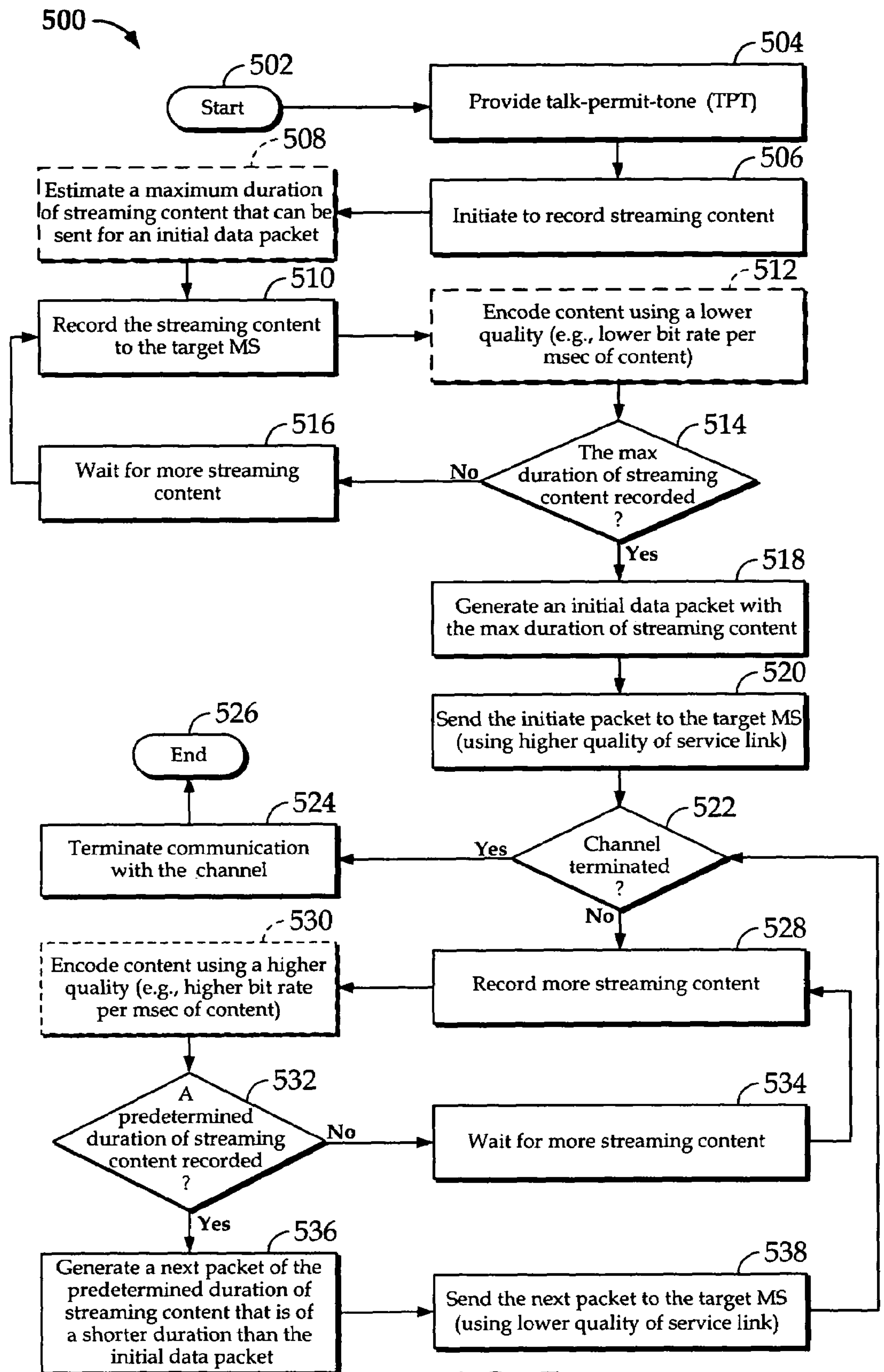
FIG. 5 comprises a flow chart diagram of a transmission process according to an embodiment of the invention.

Turning now to FIG. 5, a flow chart diagram of a transmission process according to an embodiment of the invention is shown and indicated generally at 500. Although the process shown is preferably implemented at the originator mobile unit, there may be other implementations that are better suited for each communication system. These processes shown, thus, can be implemented fully or partially at any of the components within the system. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. Thus, the processes shown are directed to the system, and each of them may be altered slightly to accommodate any of the components in the communications system. These other embodiments, however, are within the scope of the various teachings described.

In light of this, this particular process 500 shown starts 502 by providing a talk-permit-tone (TPT) from the target mobile station 112. In response, the process initiate 506 to record streaming content, and an optional estimation 508 of a maximum duration of streaming content that can be sent for an initial data packet if the maximum duration of streaming content is not previously defined. Specifically, since both a static (e.g., predefined) or a dynamic (e.g., estimation based on current conditions) maximum duration of streaming content for the initial data packet is contemplated, the maximum duration of streaming content can be obtained through various techniques. Moreover, in the preferred embodiment, the maximum duration of streaming content is of substantially a longest duration possible for the recorded streaming content such that the initial data packet is available on a target communication link at substantially a same time that the target mobile station completes establishing a dedicated communication channel appropriate for streaming content, which includes a time when both a target radio access network and the target mobile station have knowledge that the dedicated communication channel is established and/or a time when a server has knowledge that the dedicated communication channel is established. There may be other factors, such as passage of time, that track the appropriate maximum duration under current condition.

Accordingly, once a value of the maximum duration of streaming content is obtained, the streaming content to the target mobile station 112 is recorded 510 and can be optionally encoded 512 using a lower quality (e.g., lower bit rate per milliseconds of content). Again, depending upon the needs and configuration of the communication system, encoding the recorded streaming content using a lower quality may be preferred. It is next determined 514 whether the maximum duration of streaming content has been recorded, and if not, the process 500 waits 516 for more streaming content and repeats to record 510 more of the streaming content until the maximum duration of streaming content has been recorded. If this is the case, an initial data packet with the maximum duration of the streaming content is generated 518 and sent 520 to the target mobile station 112, which can be optionally done using a higher quality of service link.

After the initial data packet has been sent, it is next determined 522 whether the dedicated communication channel between the mobile stations 110, 112 has been terminated. If the dedicated communication channel has, in fact, been terminated, the process 500 terminates 524 communication with the communication channel, which ends 526 the process 500 at this point. If, on the other hand, the communication channel has not been terminated, more streaming content is recorded 528, which can be optionally encoded 530 using higher quality (e.g., higher bit rate per millisecond of content). It is determined 532 whether a predetermined duration of streaming content has been recorded, and this predetermined duration is preferably of a shorter duration than the maximum duration of streaming content of the initial data packet. If the predetermined duration of streaming content has not been recorded, the process 500 again waits 534 for more streaming content, and upon receiving the predetermined duration, a next data packet with the predetermined duration of streaming content is generated 536 and sent 538 to the target mobile station 112. In one embodiment, unlike the initial data packet, this next data packet can be sent using a lower quality of service link. At this point, the process 500 loops back to check 522 again whether the communication channel has been terminated.

Figure 6:
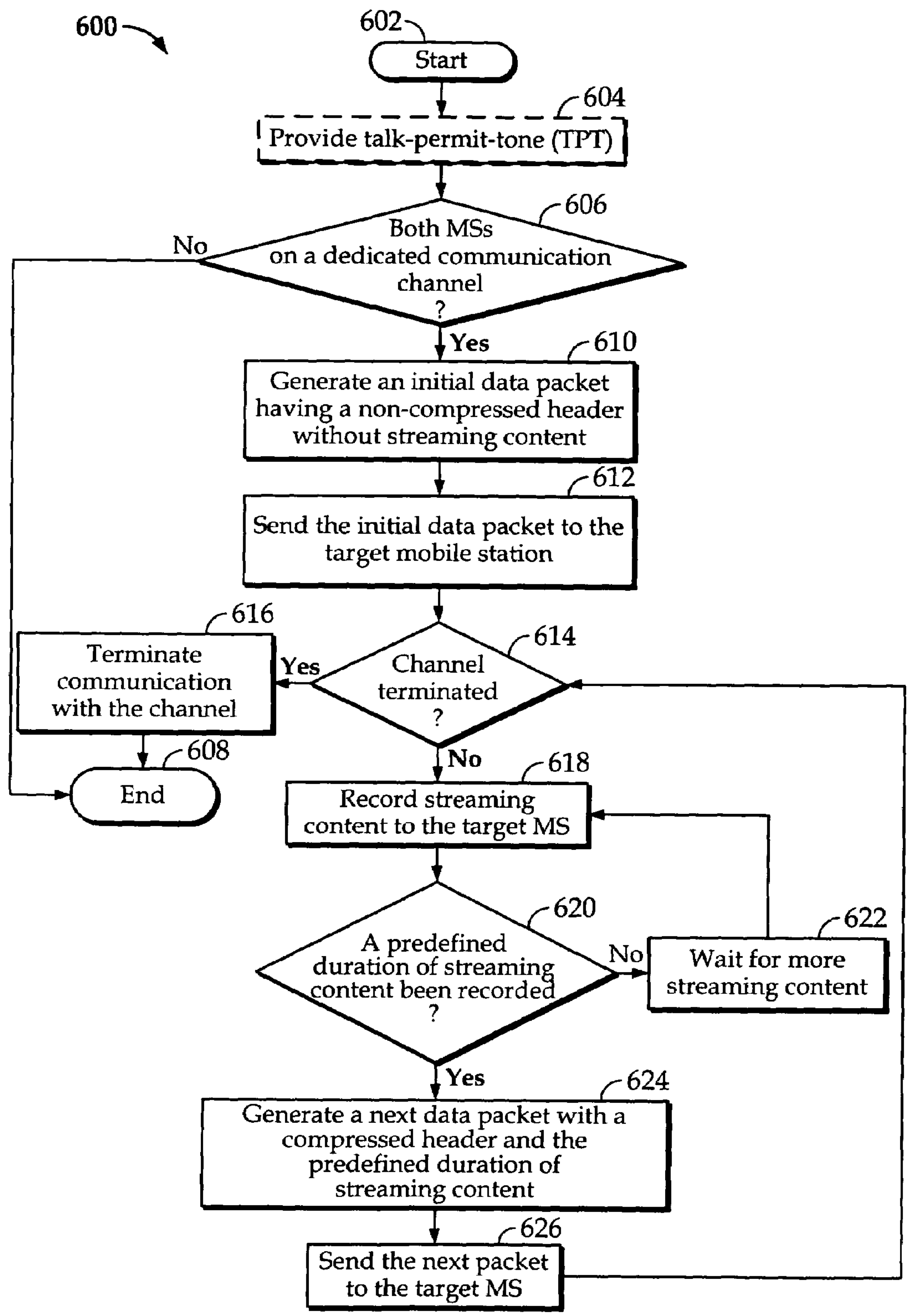
FIG. 6 comprises a flow chart diagram of a transmission process according to an embodiment of the invention.

Referring now to FIG. 6, a flow chart diagram of a transmission process according to various embodiments of the invention is shown and indicated generally at 600. The transmission process 600 starts 602 with a talk-permit-tone being provided from the target mobile station 112. Responsive to this talk-permit-tone, it is determined 606 whether both the originator mobile station 110 and the target mobile station 112 are on a dedicated communication channel, and if not, the process simply ends 608 at this point. If, however, both mobile stations 110, 112 are already on the dedicated communication channel, an initial data packet having a non-compressed header and without any streaming content is generated 610 and sent 612 to the target mobile station 112.

The dedicated communication channel is then checked to determine 614 whether it has been terminated, and if so, communication with the dedicated communication channel is terminated 616, which brings the process to an end 608. If, on the other hand, the communication channel has not been terminated, the process 600 begins to record 618 streaming content to be sent to the target mobile station 112. A predefined duration of streaming content is checked to determine 620 whether it has been recorded, and if not, the process 600 waits 622 for more streaming content to be recorded 618. Upon the predefined duration streaming content being recorded, a next data packet with a compressed header and the predefined duration of streaming content is generated 624 and sent 626 to the target mobile station 112. The process next loops back to determine 614 whether the communication channel has been terminated and repeats the process from this point for other data packets.

Through the various embodiments, an improved data packet transmission technique has been provided that, among other things, reduces the audio delay of the transmission by approximately as much as 150 milliseconds in one embodiment. For another embodiment, the audio delay is reduced by approximately 40 milliseconds. Furthermore, the various teachings effectively reduce the number of packets of the initial audio transmission by as much as 12%, which, in turn, reduces network load. In other words, the various teachings described reduce the current audio delay, while, at the time, provide a more efficient use of data packet transmission. Moreover, since the various embodiments can be implemented easily at the client level, the feature implementation costs are minimal.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated.

I claim:

1. A method comprising:

initiating recording of streaming content responsive to a request to communicate with a target mobile station;

recording the streaming content to provide recorded streaming content;

generating an initial data packet with the recorded streaming content after a maximum duration of streaming content has been recorded, wherein the maximum duration of streaming content is of substantially a longest duration possible for the recorded streaming content such that the initial data packet is available on a target communication link at substantially a same time that the target mobile station completes establishing a dedicated communication channel appropriate for streaming content;

sending the initial data packet to the target mobile station.

2. The method according to claim 1, wherein the target mobile station completes establishing a dedicated communication channel appropriate for streaming content refers to any one or more selected from a group comprising a time when both a target radio access network and the target mobile station have knowledge that the dedicated communication channel is established and a time when a server has knowledge that the dedicated communication channel is established.

3. The method according to claim 1, wherein the maximum duration of streaming content is less than any one or more selected from a group comprising a play-out buffer depth target of the target mobile station and a maximum data packet size allowed by transport protocols.

4. The method according to claim 1, wherein the maximum duration of streaming content is based on any one or more selected from a group comprising a number of milliseconds per vocoded frame, a duration of time until an originator mobile station completes being placed on a traffic channel, a fixed delay after a last vocoded frame is recorded by the originator mobile station before the data packet is ready on transmission on a reverse link, transmission bit rate across a speaker reverse link, a fixed network delay incurred delivering a packet from a cellular infrastructure of the originator mobile station up to a server and then down to a cellular infrastructure of a target mobile station, and bits per packet containing predefined vocoded frames.

5. The method according to claim 1 further comprising:

recording additional streaming content for communication with the target mobile station to provide additional recorded streaming content;

generating a next data packet with the additional recorded streaming content after a predetermined duration of streaming content has been recorded, wherein the predetermined duration of streaming content is of a shorter duration than the maximum duration of streaming content of the initial data packet;

sending the next data packet to the target mobile station.

6. The method according to claim 5 further comprising, prior to generating a next data packet with the additional recorded streaming content:

encoding the additional recorded streaming content with a higher quality than the initial data packet.

7. The method according to claim 5 further comprising, prior to generating a next data packet with the additional recorded streaming content:

determining whether the predefined duration of streaming content has been recorded;

when the predefined duration of streaming content has not yet been recorded, waiting for more streaming content to be recorded until the predefined duration of streaming content has been recorded.

8. The method according to claim 1 farther comprising, prior to initiating recording of streaming content responsive to a request to communicate with a target mobile station:

providing a talk-permit-tone to a user.

9. The method according to claim 1 farther comprising, prior to generating an initial data packet with the recorded streaming content:

estimating the maximum duration of streaming content for the initial data packet.

10. The method according to claim 1 farther comprising, prior to generating an initial data packet with the recorded streaming content after a maximum duration of streaming content has been received:

encoding the recorded streaming content with a lower quality than a subsequent data packet.

11. The method according to claim 1 farther comprising, prior to generating an initial data packet with the recorded streaming content after a maximum duration of streaming content has been received:

determining whether the maximum duration of streaming content has been recorded;

when the maximum duration of streaming content has not yet been recorded, waiting for more streaming content to be recorded until the maximum duration of streaming content has been recorded.

12. A method comprising:

generating an initial data packet having a non-compressed header without streaming content when an originator mobile station and a target mobile station are connected on a dedicated communication channel;

sending the initial data packet to the target mobile station;

recording a predefined duration of streaming content to provide a recorded predefined duration of streaming content;

generating a next data packet having a compressed header with the recorded predefined duration of streaming content;

sending the next data packet to the target mobile station.

13. The method according to claim 12 further comprising, prior to generating an initial data packet having a non-compressed header without streaming content:

providing a talk-permit-tone to a user.

14. The method according to claim 12 further comprising, prior to generating a next data packet having a compressed header with the recorded predefined duration of streaming content:

determining whether the predefined duration of streaming content has been recorded;

when the predefined duration of streaming content has not yet been recorded, waiting for more streaming content to be recorded until the predefined duration of streaming content has been recorded.

15. An apparatus comprising:

a streaming content circuit that initiates to recording of streaming content responsive to a request to communicate with a target mobile station and records the streaming content to provide recorded streaming content;

a packet generator circuit coupled to the streaming content circuit, wherein the packet generator circuit generates an initial data packet with the recorded streaming content after a maximum duration of streaming content has been recorded in such a way that the maximum duration of streaming content is of substantially a longest duration possible for the recorded streaming content such that the initial data packet is available on a communication link at substantially a same time that the target mobile station establishes a dedicated communication channel;

a transceiver circuit coupled to the packet generator circuit, wherein the transceiver circuit sends the initial data packet to the target mobile station.

16. The apparatus as defined in claim 15, wherein the maximum duration of streaming content is less than any one or more selected from a group comprising a play-out buffer depth target of the target mobile station and a maximum data packet size allowed by transport protocols.

17. The apparatus as defined in claim 15, wherein the maximum duration of streaming content is based on any one or more selected from a group of comprising a number of milliseconds per vocoded frame, a duration of time that until an originator mobile station completes being placed on a traffic channel, a fixed delay after a last vocoded frame is recorded by the originator mobile station before generated for the data packet before is ready on transmission on a reverse link, transmission bit rate across a speaker reverse link, a fixed network delay incurred delivering a packet from a listener cellular infrastructure of the originator mobile station up to a streaming server and then down to a cellular infrastructure of a target mobile station, and bits per packet containing predefined vocoded frames.

18. The apparatus as defined in claim 15, wherein the streaming content circuit records additional streaming content for communication with the target mobile station to provide additional recorded streaming content, the packet generator circuit generates a next data packet with the additional recorded streaming content after a predetermined duration of streaming content has been recorded, wherein the predetermined duration of streaming content is of a shorter duration than the maximum duration of streaming content of the initial data packet, and the transceiver circuit sends the next packet to the target mobile station.

19. An apparatus comprising:

a streaming content circuit that records a predefined duration of streaming content to provide a recorded predefined duration of streaming content;

a packet generator circuit that generates an initial data packet having a non-compressed header without streaming content when a originator mobile station and a target mobile station are connected on a dedicated communication channel and generates a next packet having a compressed header with the recorded predefined duration of streaming content;

a transceiver circuit coupled to the packet generator circuit, wherein the transceiver circuit sends the next packet to the target mobile station.

* * * * *